Feb. 23, 1971  H. E. SPAULDING ET AL  3,565,721
LABEL APPLICATION APPARATUS AND METHOD
Filed July 29, 1969  6 Sheets-Sheet 2
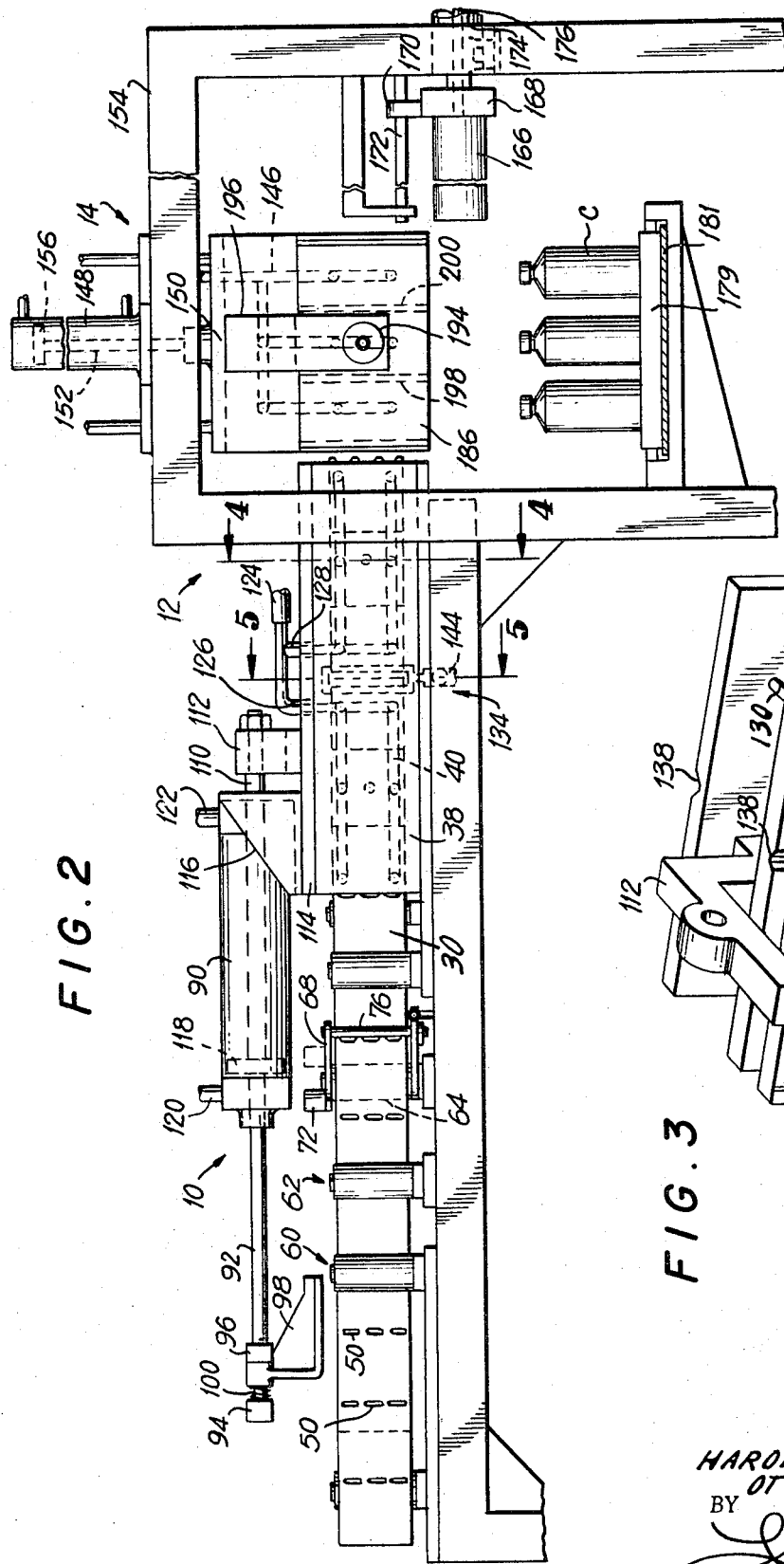
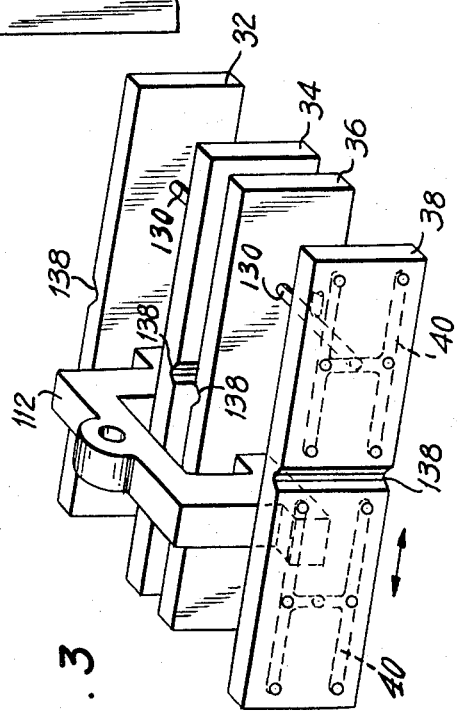
INVENTORS
HAROLD ERNEST SPAULDING
OTTO PAUL KALMBACH
BY
ATTORNEY INVENTORS
HAROLD ERNEST SPAULDING
OTTO PAUL KALMBACH
BY
L. R. Kohan
ATTORNEY

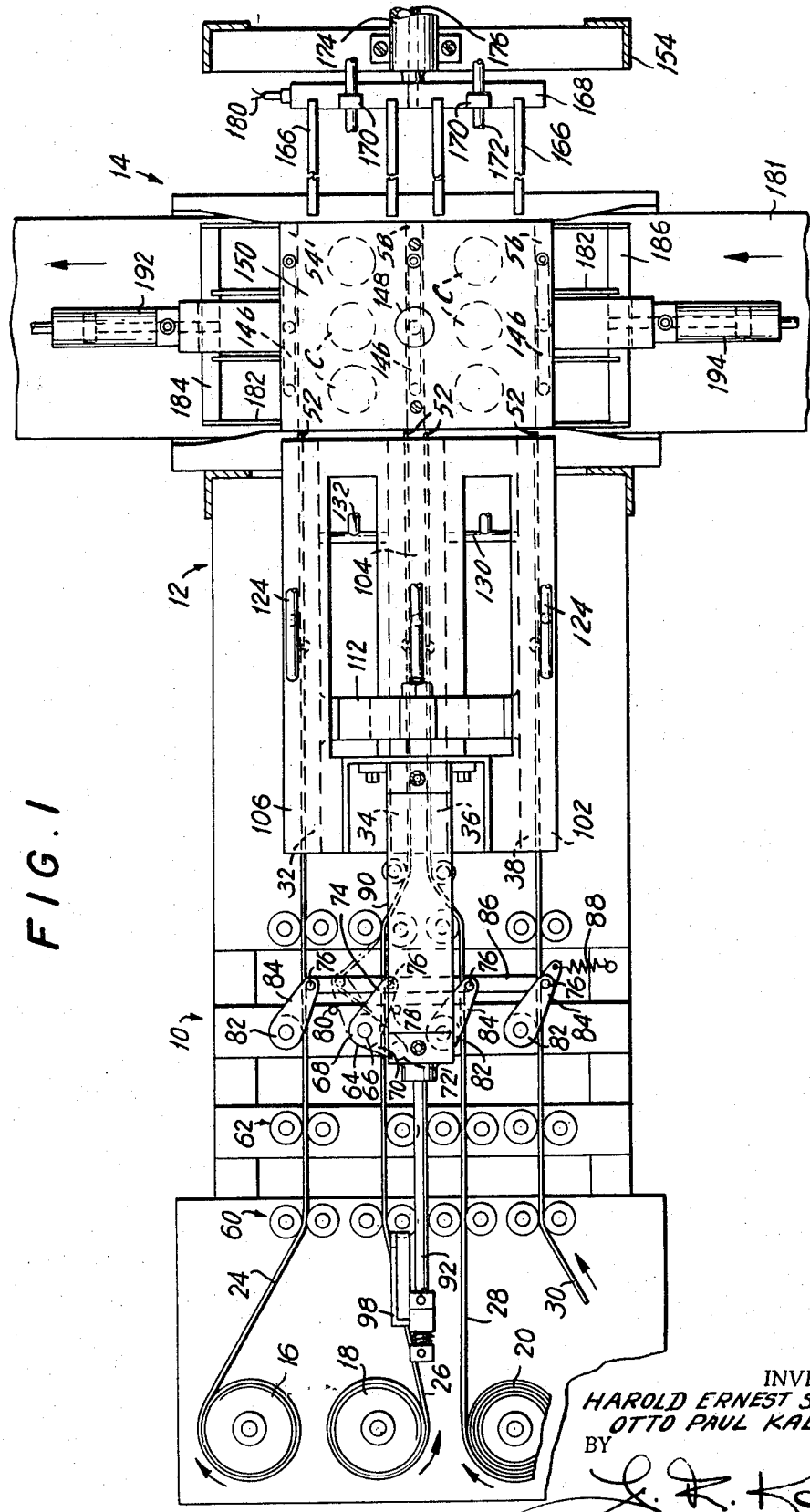

INVENTORS
HAROLD ERNEST SPAULDING
OTTO PAUL KALMBACH
BY
ATTORNEY

INVENTORS
HAROLD ERNEST SPAULDING
OTTO PAUL KALMBACH
BY
ATTORNEY

Feb. 23, 1971 H. E. SPAULDING ET AL 3,565,721
LABEL APPLICATION APPARATUS AND METHOD
Filed July 29, 1969 6 Sheets-Sheet 6
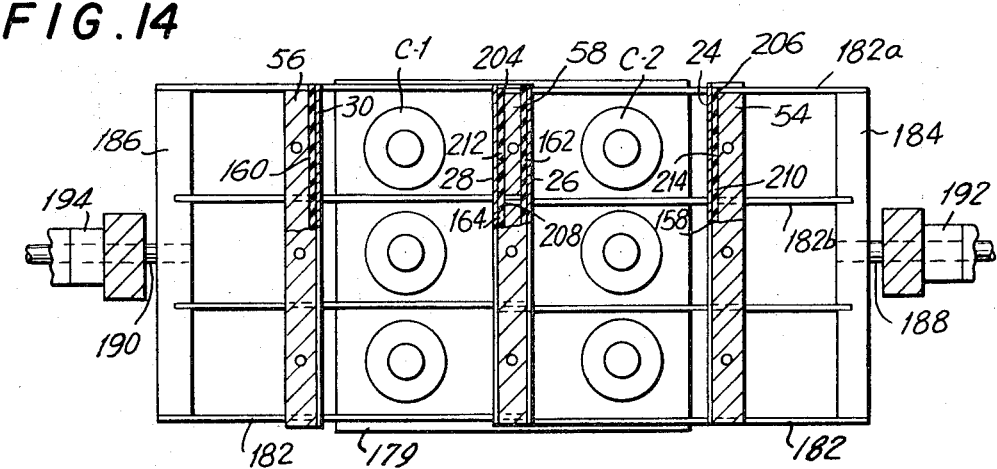
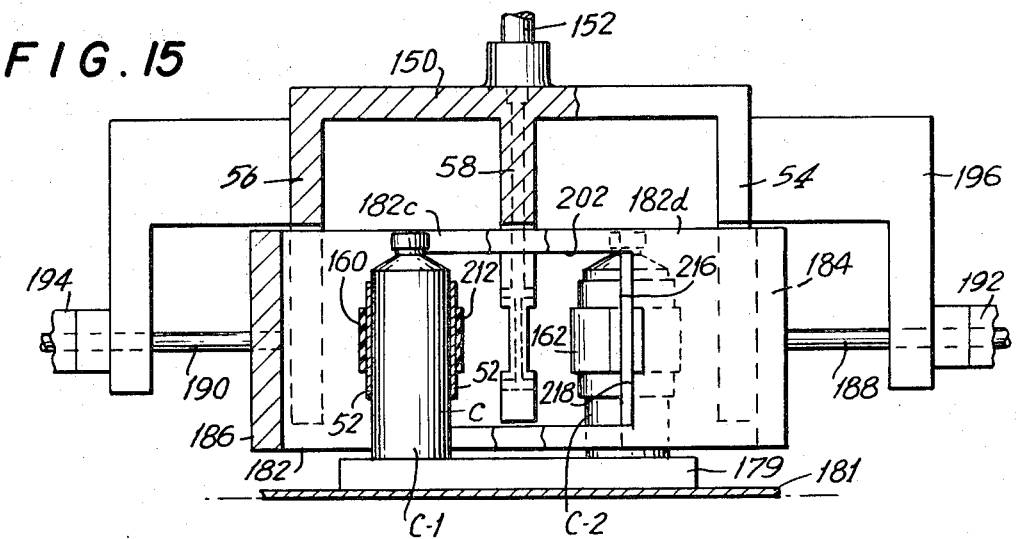
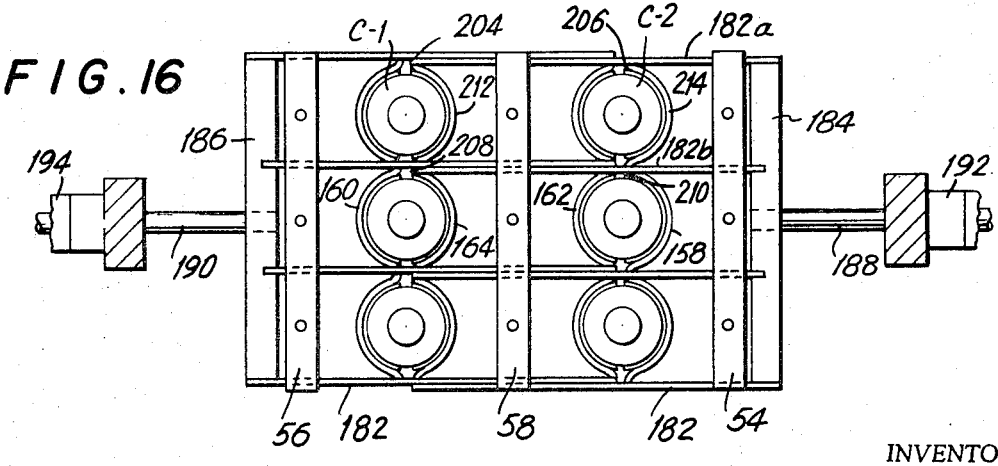
INVENTORS
HAROLD ERNEST SPAULDING
OTTO PAUL KALMBACH
BY
*J. F. Kohan*
ATTORNEY

United States Patent Office 3,565,721
Patented Feb. 23, 1971

3,565,721
LABEL APPLICATION APPARATUS AND METHOD
Harold Ernest Spaulding, Belle Mead, N.J., and Otto Paul Kalmbach, Warrington, Pa., assignors to American Can Company, New York, N.Y., a corporation of New Jersey
Filed July 29, 1969, Ser. No. 860,133
Int. Cl. B32b 31/20; B65b 61/18
U.S. Cl. 156—256
22 Claims

ABSTRACT OF THE DISCLOSURE

An apparatus and method for simultaneously applying labels to a plurality of articles, such as containers, which intermittently feeds labels from a continuous web within which individual labels are separated by lines of weakness, such as perforations, scoring or the like. As the labels are fed, a label breaker device is operable to separate labels from the web along the lines of weakness, the separated labels are thereafter advanced to a position where they are transferred in a transverse direction to a position adjacent a plurality of spaced articles where the labels are simultaneously applied to the articles.

BACKGROUND OF THE INVENTION

This invention relates to simultaneously applying labels to a plurality of articles, such as containers, leading toward an increase in the overall label application rate as compared to applying labels to a single article at a time.

Numerous arrangements have been proposed for applying labels to containers by machine, but in such arrangements the labels are applied to individual containers as the latter pass in line, one after the other, into a label application station. For example, in some of these known arrangements, various devices are used for rotating individual containers as the label is applied thereto. Accordingly, the overall rate of label application is limited by the amount of time required to apply the label to each container in that impact energies rise with the speed, increasing the frequency of damaged containers. Also, the miss frequency of label application rises as more violent label pick-up is experienced.

The disadvantages of these known arrangements lie in the fact that their overall speed of operation was not always capable of fulfilling the requirements of modern high speed production.

Pursuant to the present invention, the aforesaid disadvantages are substantially eliminated by providing for simultaneously labeling a plurality of articles, such as containers. This permits slow speed operation of the label handling mechanism while still permitting high, overall production rates. In the present invention, a plurality of container articles may be carried in a matrix system such as shown in U.S. Pat. 3,431,702, and advanced to the label applicator where the matrix is stopped and the labels applied to the containers in the matrix. The containers remain in the matrix during the entire label application operation.

In the illustrated embodiment, labels are simultaneously applied to six containers in a single matrix but the matrix and apparatus may be constructed and arranged to simultaneously apply labels to any number of containers. The matrix serves to provide appropriate center-to-center spacing of the containers to thereby obtain the required clearances between containers to permit the introduction of appropriate label application devices. Also the matrix reduces motion shock to all containers to a fixed number of shocks equal to the number of starts and stops the system imposes. However, no shock exceeds the level imposed by a single container's mass and velocity change because there is no transfer of shock from container to container as in a sequential system.

Therefore, the present invention comprises apparatus for simultaneously applying labels to a plurality of articles which are maintained in fixed spaced relationship as the labels are applied. The labels are supplied from one or more continuous webs wherein individual labels are separted by lines of ewakness whereby a label breaker is operable to separate the labels from the webs along the lines of weakness and transfer such separated labels to a position adjacent the plurality of spaced articles. Thereafter, a label application device utilizing flexible bands is operable to substantially simultaneously apply the labels to the adjacent articles.

Numerous other features and advantages of the invention will be apparent as it is better understood from the following description which is a preferred embodiment thereof.

SUMMARY OF THE INVENTION

A system for simultaneously applying labels to a plurality of articles, such as containers, including means for intermittently feeding labels from a continuous web wherein individual labels are separated by weakened lines, such as perforations, scoring or the like. Incorporated in the feeding means is a label breaker device operable to separate labels from the web along the lines of weakness. The separated labels are thereafter advanced to a position wherein they are transferred to a transverse feed means which carries the separated labels in a transverse direction to a position adjacent a plurality of spaced articles. Applicator means carried on the transverse feed means are operable to engage the labels, carry the latter to the articles, and apply them substantially simultaneously to the plurality of spaced articles.

BRIEF DESCRIPTION OF THE DRAWINGS

FIG. 1 is a plan view of a label application apparatus constructed according to the invention;

FIG. 2 is a side elevational view of the label application apparatus of FIG. 1;

FIG. 3 is a perspective view of the horizontal transfer plates and the yoke by which the transfer plates are reciprocated;

FIG. 14 is a plan view, partially broken away and in section, taken substantially along the line 14—14 of FIG. 13;

FIG. 15 is a side elevational view, similar to FIG. 13, but only partially in section, and showing the position of the parts just after the labels have been applied to the containers;

FIG. 16 is a plan view of the apparatus shown in FIG. 15, with parts omitted for purposes of illustration, showing the position of the parts just after the labels have been applied to the containers.

DESCRIPTION OF THE PREFERRED EMBODIMENTS

Figure 4:
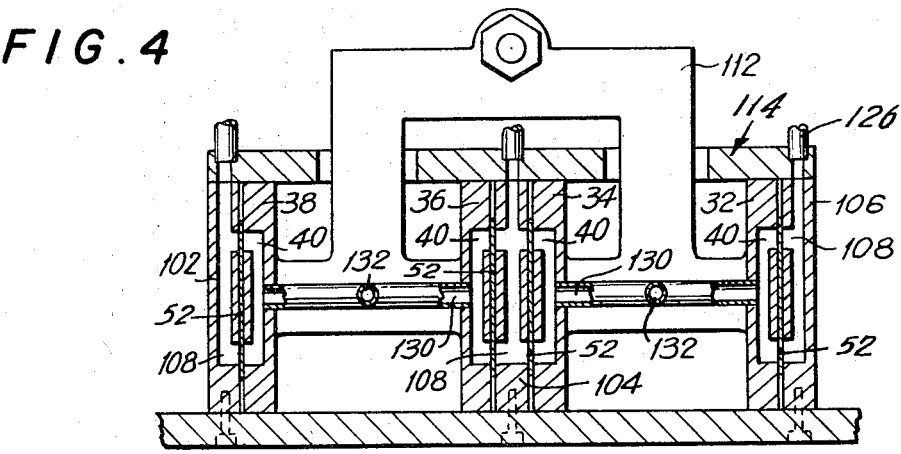
FIG. 4 is a sectional view taken along line 4—4 of FIG. 2.

Referring to the drawings, FIGS. 1 and 2 show a label registration device 10 operating in conjunction with a label feed device 12 which feeds labels to a label transfer and application device 14. The label registration device 10 mounts four rolls of labels 16, 18, 20, 22 of which only three are shown on FIG. 1, on vertical axes. Each feeds a continuous web 24, 26, 28, 30 respectively, of connected labels to the label registration device 10.

The four webs 24, 26, 28, 30 are pulled through the label registration device 10 by the label feed device 12 which utilizes four horizontal transfer plates 32, 34, 36, 38 having vacuum grooves 40 which grip the forward leading portions of the webs 24, 26, 28, 30 respectively, and upon being reciprocated, pulls the webs from left to right.

As can best be seen in FIG. 2, each web 24 to 30 is provided with regularly spaced, transverse perforation lines 50 so that a complete label 52 is included between two horizontally spaced perforation lines 50.

Figure 11:
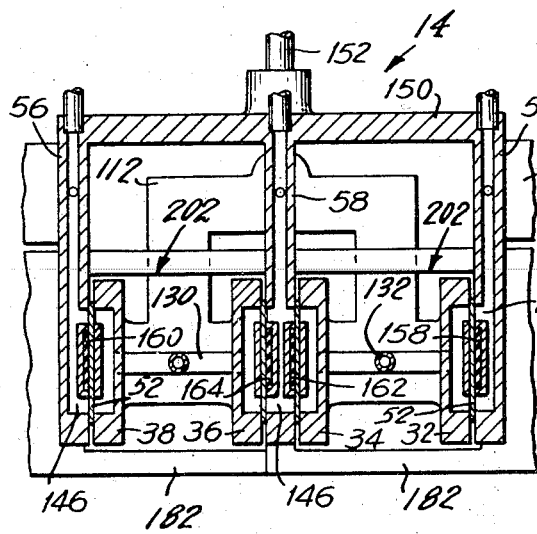
FIG. 11 is a sectional view taken along line 11—11 of FIG. 8.

In the illustrated embodiment, a group of three labels 52 is severed or separated from each of the webs 24 to 30 upon each cycle of operation, as will be described hereinafter. The horizontal transfer plates 32 to 38 have a horizontal length approximately equal to the horizontal length of six individual labels 52. However, the horizontal transfer plates 32 to 38 are horizontally reciprocal over a stroke just slightly greater than the horizontal length of three labels 52, as will be further described. Thus, the transfer plates 32 to 38 function to pull three labels 52 at a time through the registration device 12, sever every third label from its respective web 24 to 30, and thereafter transfer the group of three severed labels to a vertical transfer means comprising end vertical transfer plates 54, 56 (FIG. 11) and intermediate transfer plate 58, which transfers or lowers them to the container articles C, as will be hereinafter described. The group of three labels are severed from each other as they are substantially simultaneously applied to the containers C.

Turning to a more detailed consideration of the invention, each freely rotatable roll of labels 16 to 22 feeds the webs 24 to 30 respectively between pairs of guide rolls 60 and 62. Thereafter, each web 24, 26, 28, 30 passes through the operating mechanism of the indexing device 12, which is operable to index every third label on the webs.

The indexing mechanism for the web 26 comprises a guide roll 64 rotatable about a vertical axle 66 and a bell crank lever 68 mounted for pivotal movement on the upper portion of the axle 66. The bell crank lever 68 has one arm 70 carrying on its upper face an actuating lug 72. The other arm 74 of the bell crank lever 68 carries a vertically disposed indexing rod 76. It will be seen that the bell crank lever 68 is adapted to be pivoted between the solid position shown in FIG. 1, wherein it rests against the stop 78, and the broken line position in FIG. 1, wherein it rests against another stop 80. It will be apparent that the vertical indexing rod 76 is located on the inboard side of the web 26 so that the rod 76 displaces and diverts the web 26 from its straight line path when the bell crank lever 68 is pivoted counterclockwise to the broken position (FIG. 1). The objectives to be achieved by this indexing operation will become apparent as the description proceeds.

The indexing mechanisms for the webs 24, 28, 30 are similar to that described hereinbefore. Each comprises a guide roll 82 rotatable about a vertical axle and an arm 84 mounted for pivotal movement on the upper portion of the respective axle. Each arm 84 is connected to the arm 74 of the bell crank lever 68 by means of a connecting link 86, so that the bell crank lever 68 and each of the three arms 84 pivot together as a unit. The connecting link 86 is connected to the bell crank lever 68 and to the arms 84 by suitable pivotal connections.

The bell crank lever 68 and arms 84 are normally maintained in the position shown in solid lines in FIG. 1 with the lever 68 resting against the stop 78 using a biasing means such as a spring 88. In this solid line FIG. 1 position, the webs 24, 26, 28, 30 traverse a straight line path through the indexing mechanism.

In order to pivot the lever 68 and arms 84 to the indexing position shown in broken lines in FIGS. 1 and 2, an actuating means is provided to engage the lug 72, such actuating means comprising a power cylinder 90 operable to reciprocate a piston rod 92. Fixed to the piston rod 92 are a pair of spaced collars 94 and 96 between which there is slidably supported an operating finger 98 which is normally biased against the collar 96 as by a coil spring 100.

Figure 8:
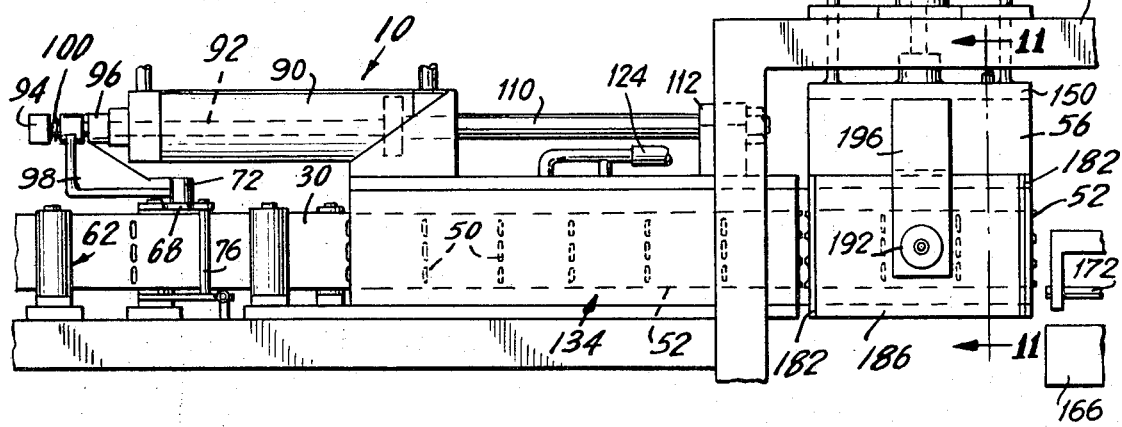
FIG. 8 is a side elevational view similar to FIG. 2 but showing the label feed parts in an advanced position.

When the piston rod 92 is reciprocated to the right from the position shown in FIG. 2 to the position shown in FIG. 8 of the drawings, the finger 98 will engage the lug 72 on the bell crank lever 68 and pivot the latter to the broken line position shown in FIG. 1. Arms 84 will also be pivoted counterclockwise to a position corresponding to the broken line position of arm 74 in FIG. 1. Pivotal movement of the lever 68 is arrested by engagement with the stop 80. If the piston rod 92 continues to travel slightly further to the right after the lever 68 engages stop 80, the slidable finger 98 will merely slide on the piston rod 92 against the bias of spring 100 as the lever 68 remains stationary against the stop 80. Accordingly, the piston rod 92 may have a greater stroke than that required to pivot the lever 68 from the solid to the broken line positions in FIG. 1.

Since the indexing mechanism 10 operates in conjunction with the label feed device 12, a description of the latter will be set forth before describing the overall operation. It will be recalled that the label feed device 12 comprises four horizontal transfer plates 32, 34, 36, 38 having vacuum grooves 40 which serve to adhere thereto the leading sections of the webs 24, 26, 28, 30 respectively, to pull the latter through the indexing mechanism.

Operating in conjunction with each of the horizontal transfer plates 32, 34, 36, 38 are stationary holding plates 102, 104, 106, each of which also has a series of vacuum grooves 108. Each holding plate 102, 104, 106 has a horizontal length equal to the horizontal length of the horizontal transfer plates 32 to 38, which, as previously mentioned, are at least equal to the horizontal length of six individual labels 52. The side of the holding plates 102, 104, 106, having the vacuum groove openings therein, face the side of the corresponding transfer plates 32 to 38 having the vacuum groove openings therein, whereby when the respective webs 24 to 30 are disposed therebetween, either one of the transfer plates 32 to 38 or holding plates 102, 104, 106 may grip the respective webs 24 to 30, as will be further described. Thus, the mating pairs of holding plates and transfer plates are spaced from one another a distance just slightly greater than the thickness of the paper webs 24 to 30.

The transfer plates 32 to 38 are mounted for reciprocal, horizontal movement a distance just slightly greater than the length of three labels 52. The reciprocal movement is effected by the same operating cylinder 90, previously described, used for reciprocating the piston rod 92 and actuating finger 98. Thus, the operating cylinder 90, operates a second piston rod 110 which in turn is affixed to the four horizontal plates 32, 34, 36, 38 by a yoke 112. The operating cylinder 90 is mounted on a supoprting frame 114 (FIG. 2) for the label feed device by the bracket 116. As can best be seen in FIG. 2, the two piston rods 92, 110 are fixed to a common piston 118 and extend from opposite sides of the latter. A fluid medium, e.g., compressed air, is admitted and discharged from the operating cylinder 90 by the connections 120, 122 shown in FIG. 2.

The vacuum grooves 108 in the stationary holding plates 102, 104, 106 communicate with a source of vacuum (not shown) through passages 130 (FIG. 4) in the yoke 112, the passages 130 in turn being in communication with a vacuum line 132.

Figure 5:
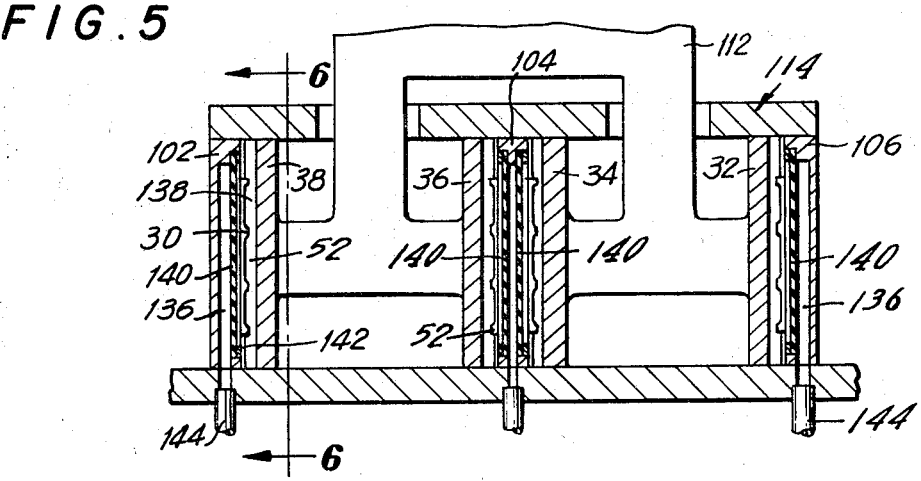
FIG. 5 is a sectional view taken along line 5—5 of FIG. 2.
Figure 6:
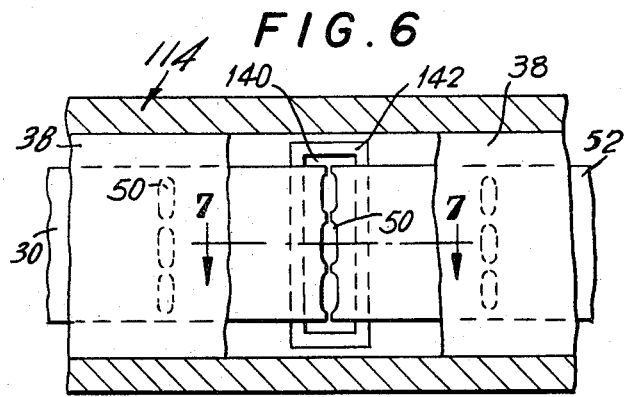
FIG. 6 is a sectional view taken along line 6—6 of FIG. 5.

Included in the label feed device 12 is a label breaker, indicated generally at 134 (FIG. 2). which is operable to break the line of perforations 50 of every third label 52. The label breaker 134 is located midway along the horizontal length of the holding plates 102, 104, 106. Referring to the label breaker 134, associated with the holding plate 102 and transfer plate 38 as shown in detail in FIGS. 5 to 7, opposing vertical grooves 136, 138 are provided in the holding plate 102 and transfer plate 38, respectively.

The vertical groove 136 in the holding plate 102 is covered with a flexible diaphragm 140 made of rubber or similar material. In order to secure the diaphragm 140 in position over the groove 136, a holding frame or retaining member 142 engages the borders along the four edges of the diaphragm 140 and holds the borders against a ledge extending around the groove 136 as can best be seen in FIG. 7. The retaining member 142 may be held in place by a force fit or by suitable threaded fasteners such as machine screws (not shown).

Figure 7:
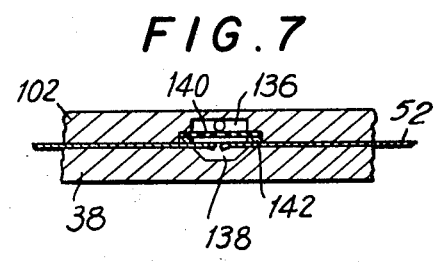
FIG. 7 is a sectional view taken along line 7—7 of FIG. 6.

It will be apparent that the diaphragm 140 closes off the open face of the groove 136. When air under pressure is introduced into the groove 136, as will be further described, the diaphragm 140 will flex outwardly into the adjacent groove 138 in the horizontal transfer plate 38. Thus, with the grooves 136, 138 disposed opposite one another as shown in FIG. 7, and with the paper web 30 disposed between the two grooves 136, 138 with one of the lines of perforation 50 on the web 30 disposed opposite said grooves, 136, 138, introduction of air under pressure into groove 136 will cause diaphragm 140 to expand into groove 138 and in so doing to urge the paper web 30 into the latter groove 138. However, since the paper is not flexible as is the rubber diaphragm 140, and since the line of perforation 52 is located between the two grooves 136, 138, it will be readily apparent that the web 30 will be severed along the line of perforation 50 by the expanding diaphragm 140.

As will be further described, the label registration device 10 operates to insure that a line of perforation 50 will be located between the opposing grooves 136, 138 each time the apparatus is indexed. The air under pressure may be supplied to the groove 136 by an air supply hose 144 shown in FIG. 5. Although only one label breaker 134 has been described in detail, it will be understood that there is a similar label breaker associated with each of the other three horizontol transfer plates 32, 34, 36 and the respective holding plates 104, 106. FIG. 3, for example shows a label breaker groove 138 in each of the holding plates 32, 34, 36, 38.

When operating the indexing and label feed devices 10 and 12 respectively, air is admitted through conduit 122 to urge piston 118 to the position shown in FIG. 2. In this position, the piston rod 92 is extended to the left and the operating finger 98 is spaced a maximum distance from the lug 72. Accordingly, the bell crank arm 74 is urged against the stop 78 through the connecting line 86 and the bias of spring 88 and the webs 24 to 30 are free to travel a straight line path through the indexing device 10.

Also in the position shown in FIGS. 1, 2, and 3, the piston rod 92 is fully to the left so that the yoke 112 and the horizontal transfer plates 32 to 38 are in their maximum left handed position. In this latter position, the horizontal transfer plates 32 to 38 mate with the holding plates 102, 104, 106 respectively over their entire horizontal length. Thus, as can be seen in FIG. 1, the left and right hand edges of transfer plates 32 to 38 are in alignment with the left and right hand edges of holding plates 102, 104, 106 respectively.

When the transfer plate 38 is in the position shown in FIGS. 1 and 2, the vertical groove 138 in the transfer plate 38 is disposed opposite the vertical groove 136 in the holding plate 102 and the grooves 136, 138 appear as shown in FIG. 7. Air pressure may be applied to the groove 136 through the supply hose 144 to expand the diaphragm 140 and thereby sever the web 30 at the line of perforation 50 located between the opposed grooves 136, 138.

The group of three labels severed from the leading end of the web 30 and the next group of three labels on the leading end of the web 30, still unsevered from the web 20, are held against the transfer plate 38 by applying a source of vacuum to the grooves 40 in the transfer plate 38 through the vacuum line connections 130, 132 (FIG. 4).

The transfer plate 38, and of course the transfer plates 32, 34, 36 which separate in the same manner as transfer plate 38, are now ready to be adavnced to the right. This is effected by admitting air under pressure via conduit 120 to the left hand side of the piston 118 in cylinder 90 where the piston 118 and piston rods 92 and 110 are advanced completely to the right. This is the position of the parts shown in FIG. 8. The stroke of the piston 118 is just slightly longer than the horizontal length of three connected labels 52 for reasons which will become apaprent as the description proceeds.

The piston rod 110, in moving to the right, also moves the transfer plates 32 to 38 to the right because the yoke 112 connects the transfer plates 32 to 38 to the piston rod 110. As the horizontal transfer plates 32 to 38 move to the right, each carries the three leading labels which are connected to one another, but severed from the respective web 24 to 30, to a position in alignment with respective vertical transfer plates 54, 56, 58. The vacuum in the grooves 40 in the horizontal transfer plates 32 to 38 may be cut off and vacuum applied to opposing vacuum grooves 146 in vertical transfer plates 54, 56, 58 whereby the three labels are transferred to plates 54, 56, 58. Thereafter, an operating cylinder 148 is actuated to lower vertical transfer plates 54, 56, 58 and the groups of three severed labels to the containers C disposed there below where the labels are applied to the containers C, as will be hereinafter described.

Returning to the operation of the label registration and feed device, it will be recalled that the transfer plates 32 to 38 also carry the three leading labels which are still connected to the respective webs. As the transfer plate 38 moves to the right, it pulls the leading end of the web 30 along with it. The web 30 is unwound from its feed roll 22 and advances through the label registration device 10. During most of the rightward movement of the transfer plate 38, the web 30 travels a straight line path through the registration device 10. However, towards the end of its rightward stroke, the operating finger 98 engages the lug 72 on bell crank lever 68 and pivots the latter counterclockwise from the solid line to the broken line position in FIG. 1. It should be pointed out that the web 30 is advanced at least a distance greater than the horizontal length of two labels 50 before the operating finger 98 engages the lug 72 so that the bell crank lever 68 does not pivot counterclockwise until after at least two connected labels 52 have passed through the indexing device 10.

The operating finger 98 is arranged to engage the lug 72 as the third line of perforation 50 of the web 30 approaches the indexing device 10. Since the bell crank lever 68 is connected to the arms 84 by the connecting link 86, it will be seen that as the bell crank lever 68 pivots counterclockwise, the arms 84 also pivot with it. Accordingly, all the indexing rods 76 will be displaced to a position corresponding to the broken line position shown in FIG. 1. Upon being displaced in this manner, the indexing rods 76 engage the webs 24 to 30 respectively and divert the latter from their straight line paths of travel. Thus, just before the piston 118 reaches the end of its rightward stroke, the bell crank lever 68 will have pivoted to its maximum counterclockwise position to about the stop 80 and the bell crank lever 68 will appear as shown in broken lines in FIG. 1. In this latter position, the arm 74 rests against the stop 80 and the third line of perforation 52 of the web 26 is still approaching the indexing rod 76.

As the transfer plates 32 to 38 continue to be moved to the right by the piston rod 110, the web 26 advances to the right until the third line of perforation comes into contact with the indexing rod 76. Because the indexing rod 76 diverts the web 26 from its straight line path of travel and because the indexing rod 76 has a relatively small diameter, the third line of perforation tends to bend or crease on the indexing rod 76. As a result, a resistance to feeding is developed. Expressed otherwise, it requires a greater force to pull the line of perforation over and past the indexing rod 76. This increased resistance causes the web 26 to slip on the transfer plate 34 as the latter continues to move to the right to complete its stroke.

As previously mentioned, the stroke of the piston 118 and transfer plate 34 is slightly greater than the horizontal length of three labels. The transfer plate 34 in advancing to the right, thus will always pull three labels past the indexing rod 76 whereby the line of perforation between the third label and the remainder of the web will engage the indexing rod 76 to arrest the advancement of the web 26 as the transfer plate 34 completes its travel to the end of its stroke and the three advanced labels slide on the transfer plate. Therefore, the line of perforation of every third label will come to rest on the indexing rod 76. It will be apparent that the position of the labels in the label feed device 10 will always be registered and any problems of the labels creeping forward or backward after a few cycles is avoided. Thus, the lines of perforation of the labels will always be positioned in the label feed device 12 at the same location as determined by the position of the indexing rod 76. Every third line of perforation will come to rest in the desired location of the label breaker 134, i.e., between the vertical grooves 136, 138 or transfer plate 38 and holding plate 102 as shown in FIG. 7. Even though there may be slight irregularities in the spacing between the lines of perforations of the web 26 or there may be slight irregularities in slippage of the web 26 as it is advanced, such irregularities are cancelled out by the indexing mechanism 10 in that the line of perforation 52 of every third label will come to rest on the indexing 76 when the latter is in the indexing and registration position.

It will be observed that after the bell crank lever 68 abuts the stop 80, the actuating finger 98 will come to rest. However, the piston 118 and the piston rod 92 can continue to the end of the stroke as the actuating finger 98 slides on the piston rod 92 against the bias of spring 100.

Upon completion of the stroke of the piston 118 to the right, the horizontal transfer plate 38 has its right hand forward half disposed opposite the vertical transfer slate 56 and its rearward or left hand half opposite the right hand half of the holding plate 102. Accordingly, the vacuum on the transfer plate 38 is cut off and vacuum is applied to the vertical transfer plate 56 and to the holding plate 102. The leading three labels, which it will be recalled were previously severed from the web 30, are thereby transferred to the vertical transfer plate 56 and the leading three labels still connected to the web 30 are transferred to the holding plate 102. The three labels on the vertical transfer plate 56 are thereafter transferred to the underlying containers C as will be described. Positive air pressure may be applied to the appropriate grooves in the horizontal transfer plates to effect the aforementioned transfer.

It will be understood that although only the operation of the vertical transfer plate 56 has been described, the other two vertical transfer plates 54 and 58 function in a similar manner in conjunction with horizontal transfer plates 32, 34, 36 to receive three connected labels and transfer the latter downwardly for application to the underlying containers C.

The transfer plate 38 is now free of all labels and is ready for its return stroke to the left. During the return stroke of the piston 118, the operating finger 98 disengages from the lug 72 and the bell crank lever 68 pivots clockwise by the bias of spring 88 whereby the indexing rod 76 no longer diverts the web 30 from its straight line path line of travel. The transfer plate 38 also returns to the position shown in FIGS. 1 and 2 whereupon, vacuum in the grooves 108 of holding plate 102 is cut off and vacuum applied to the grooves 40 in the transfer plate 38.

Accordingly, the leading six labels on the web 30 are transferred from the holding plate 102 to the transfer plate 38. As the leading six labels are in this position, air pressure is applied to the label breaking device 134 to expand the diaphragm 140 and sever the line of perforation separating the third from the fourth labels, as previously described. Thus, the cycle is ready to be repeated, as air pressure is applied to the cylinder 90 to advance the piston 118 and piston rods 92, 110 to the right.

Considering now the details of the label application device 14, it will be recalled that each of the horizontal transfer plates 32 to 38 transfer three connected labels 52 to the respective vertical transfer plates 54, 56, 58 whereby they are held in place by the vacuum grooves 146. The three vertical transfer plates 54, 56, 58 are each connected to a yoke 150 which in turn is connected to a piston rod 152. The operating cylinder 148, previously mentioned, is mounted on a fixed frame member 154 and has a piston 156 (FIG. 2) connected to the piston rod 152 whereby the yoke 150 is movable between the raised position shown in FIGS. 2, 8, and 11, an intermediate position shown in FIGS. 9 and 12, and a lowered position shown in FIGS. 10 and 13 to 16. In the latter position, the apparatus is operable to simultaneously apply the labels to six containers C disposed as shown in the drawing.

The vertical transfer plates 54, 56 each have a resilient band 158, 160 (e.g., rubber), carried in an elongated, horizontal groove in the face of the respective vertical transfer plate 54, 56 against which labels 52 from the respective webs 24, 30 are held by the vacuum grooves 146. Thus, the labels will be held against the resilient bands 158, 160 by the vacuum in the grooves 146. Similarly, two resilient bands 162, 164 are carried in elongated, horizontal grooves in opposite sides of the intermediate horizontal transfer plate 58. As will be described, these bands 158 to 164 are adapted to be wrapped partially around the side walls of the container C and in so doing apply the labels 52 to the containers C.

Figure 9:
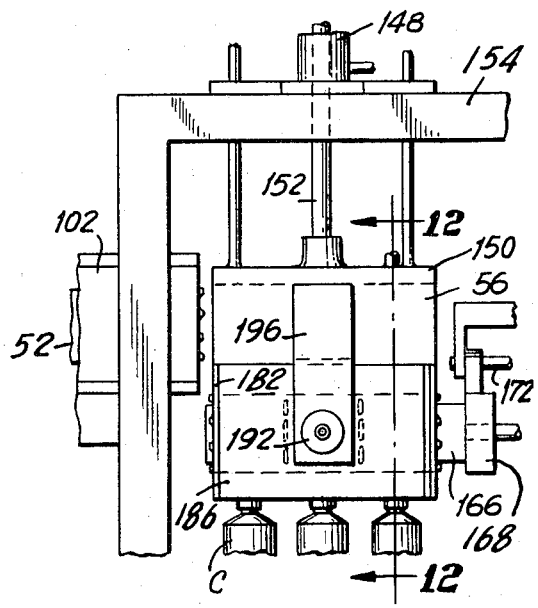
FIG. 9 is a side elevational view of part of the apparatus in FIG. 8 but showing the vertical transfer plates in an intermediate, lowered position to receive heating elements.
Figure 10:
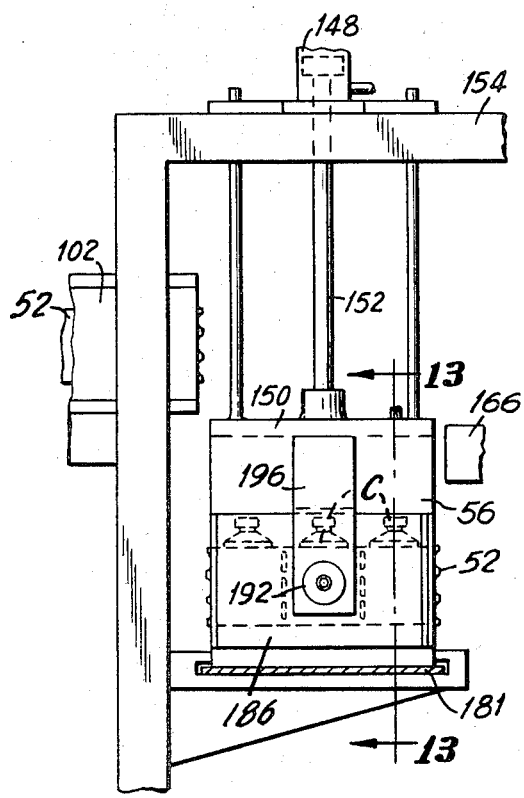
FIG. 10 is a side elevation similar to FIG. 9 but showing the vertical transfer plates in a lowered position ready to apply the labels to the containers.
Figure 12:
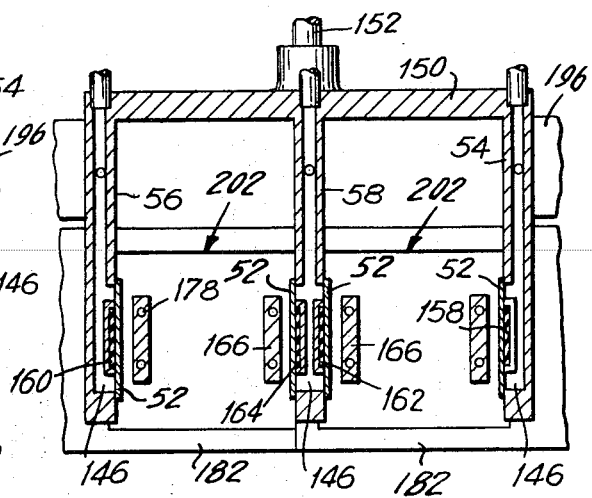
FIG. 12 is a sectional view taken along line 12—12 of FIG. 9.
Figure 13:
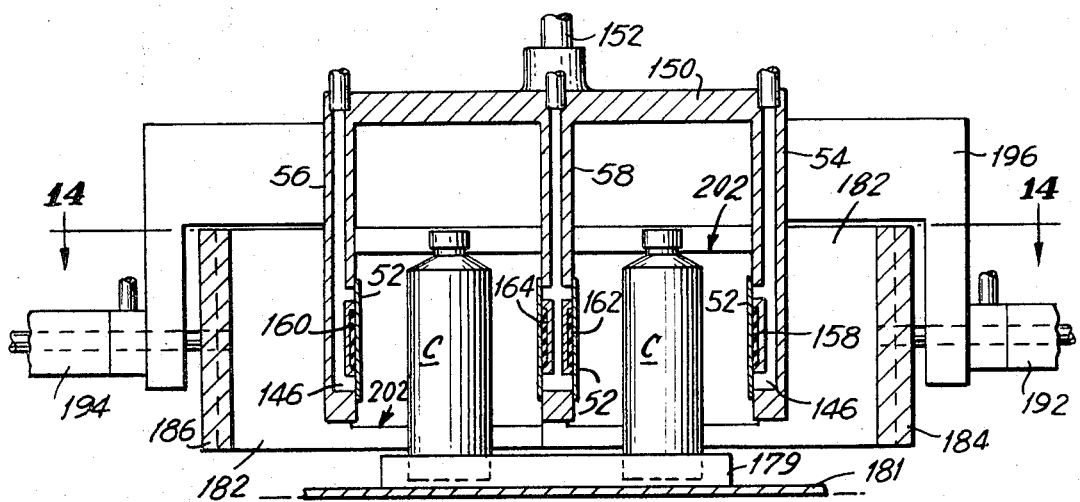
FIG. 13 is a sectional view taken along line 13—13 of FIG. 10.
Figure 17:
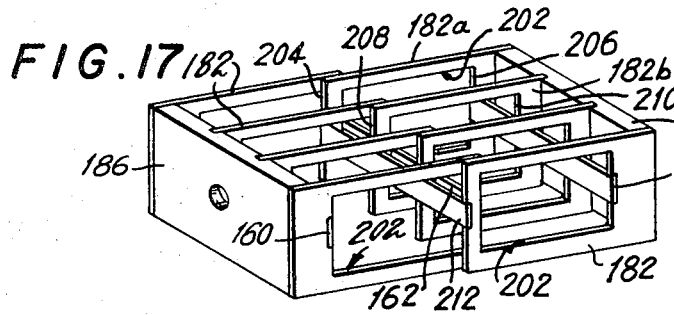
FIG. 17 is a perspective view of the label applicator plates.

After the labels 52 have been transferred to the vertical transfer plates 54, 56, 58 as previously described, the latter are lowered by the power cylinder 148 to the intermediate position shown in FIGS. 9 and 12. While in that latter position, a plurality of heating elements 166 are reciprocated from a withdrawn position (FIGS. 1 and 2) to an inserted position (FIGS. 9 and 12) wherein the heating elements 166 are positioned adjacent to the labels 52 on the vertical transfer plates 54, 56, 58 to heat an adhesive on the labels. Four heating elements 166 are mounted on a support beam 168 (FIG. 1) having one or more collars 170 which are slidably mounted, on one or more rods 172, the latter in turn being suitably fixed to the frame member 154. A power cylinder 174, fixed to the frame member 154, operates a piston rod 176 which in turn is connected to the support beam 168 to reciprocate the latter. The heaters 166 are provided with heating elements 178 (FIG. 12) suitably connected to a source of electrical power by the wires 180 (FIG. 1).

The heaters 166 are spaced from one another according to the spacing of the vertical transfer plates 54, 56, 58 so that when the cylinder 174 is operated to insert the heaters 166 into position adjacent the vertical transfer plates 54, 56, 58 (FIG. 12), there will be one heater 166 positioned adjacent to each grouping of three labels on the corresponding transfer plate. The outer surface of each label is provided with an adhesive which becomes tacky when heat is applied. After the heaters 166 are withdrawn (to the position in FIGS. 1 and 2), the labels will be ready to be adhered to a container surface. It will be apparent that when the heaters 166 are withdrawn, the vertical transfer plates 54, 56, 58 are free to vertically reciprocate past such withdrawn heaters 166.

After the labels have been heated to a tacky condition and the heaters 166 withdrawn, the vertical transfer plates 54, 56, 58 are lowered to the label application position (FIGS. 10 and 13 to 16), where they straddle six containers C that have been brought into proper position by a container holder or matrix 179 carried on a conveyor 181. The matrix 179 maintains the six containers C in the desired spacing relative to one another so that the vertical transfer plate 54, 56, 58 may be lowered to straddle the containers C as shown in FIG. 14. While in this lowered and straddled position, the labels are substantially simultaneously applied to the six containers C.

To this end, a plurality of applicator plates 182 are adapted to distend each resilient band 158–164 from its normal, unflexed position (FIGS. 11 to 14) within the groove in its respective vertical transfer plate 54, 56, 58 to its distended position (FIGS. 15 and 16), wherein the bands 158–164 are pushed out of their respective groove to apply the labels 52. Four applicator plates 182 are affixed to a yoke 184 and four others to another yoke 186. Each yoke 184, 186 is connected to a position rod 188, 190 of a power cylinder 192, 194 respectively, the latter in turn being mounted on a frame member 196 which is suitably affixed to the yoke 150 on which the vertical transfer plates 54, 56, 58 are mounted. The yoke 150 and frame member 196 define a structure which is vertically reciprocated as a unit by the vertically disposed operating cylinder 148 as previously described.

Each vertical transfer plate 54, 56, 58 has a pair of vertical slots 198, 200 (FIG. 2) which permit the two intermediate applicator plates 182 of each grouping of four to be received and reciprocated transversely to the general plane of the vertical transfer plates 54, 56, 58. Thus, each grouping of four applicator plates 182 are reciprocal along the axis perpendicular to the general plane of each of the transfer plates 54, 56, 58 with the two intermediate applicator plates 182 being accommodated in the slots 198, 200 and the two outboard applicator plates 182 straddling with ends or vertical terminating edges of the transfer plates 54, 56, 58.

Each applicator plate 182 has an opening 202 through which the horizontal transfer plates 32, 34, 36, 38 are received, as will be described, and which enables each plate 182 to distend two different label applicator bands 158–164 simultaneously.

Referring particularly to FIGS. 14 to 16, all of which show the vertical transfer 54, 56, 58 in their lowered position, FIG. 14 shows the position of the parts just after the vertical transfer plates 54, 56, 58 have descended to their lowered position to straddle the six spaced containers C and the applicator plates 182 are in their withdrawn position. FIGS. 15 and 16 show the position of the parts after the applicator plates 182 have been advanced by the power cylinders 192, 194 to the label application position.

As shown in FIG. 14, the leading edge 204 of the applicator plate 182a abuts the resilient band 164 and the latter is affixed to the leading edge 204 by adhesive, screw fasteners, or the like. Also the trailing edge 206 of the opening 202 in the applicator plate 182a abuts the band 158, the latter being suitably affixed to the trailing edge 206 as previously described. Similarly, the leading edge 208 of the plate 182b engages and is affixed to the band 164, and the trailing edge 210 of the opening 202 in plate 182 engages and is affixed to the band 158.

By comparing FIGS. 14 and 16 it will be observed that when the yoke 184 is advanced from its retracted position (FIG. 14) to its advanced position (FIGS. 15 and 16), the leading edges 204, 208 of the applicator plates 182a, 182b respectively, will push the portion 212 of the band 164 out of its groove in the vertical transfer plate 58 and advance it laterally to the position shown in FIG. 16 wherein the two applicator plates 182a, 182b partially straddle container C–1 and in so doing, wrap the portion 212 of the band 164 there between around the side walls of the container C–1. Simultaneously, the trailing edges 206, 210 of the openings 202 in the applicator plates 182a, 182b respectively, will push the portion 214 of the band 158 out of its groove in the vertical transfer plate 54 and advance it laterally to the FIG. 16 position where the two applicator plates 182a, 182b straddle the container C–2 and in so doing, wrap the portion 214 of the band 158 there between around the side walls of the container C–2.

It will be observed that the resilient bands 158 and 164 carry therewith the labels 52 of webs 28 and 24 respectively, to wrap the labels around the containers. The adhesive and band friction prevent the labels from sliding around the container and the tacky adhesive will cause the labels to adhere to the containers C–1 and C–2. Thereafter, the applicator plates 182a, 182b and bands 158, 164 are retracted to their withdrawn position (FIG. 14) where they are ready to receive additional labels to repeat the aforesaid operation.

Having described how two applicator plates 182a and 182b operate to apply two labels with band sections 212 and 214, it will become readily apparent from the drawing that the four applicator plates 182 carried on the yokes 184 and 186 are operable in the manner described to substantially simultaneously apply all twelve labels 52 to the six containers C. It will be noted that the two applicator plates 182 which pass between the same two rows of containers are arranged to slide adjacent to one another without interference, as is apparent in FIG. 16.

As two applicator plate yokes 184, 186 are simultaneously advanced towards one another, the respectively applicator plates 182 will break or sever the three connected labels along their lines of weakness. This occurs due to the fact that as the resilient bands 158 to 162 start to wrap themselves around the containers, they will stretch to conform to the cylindrical shape of the side walls of the containers and in so doing will apply tension on the connected labels to separate the latter at the lines of weakness, 50. Accordingly, the applicator means, including the applicator plates 182 and resilient bands 158, 160, 162, 164, are operable to transfer three connected labels from each vertical transfer plate 54, 56, 58, sever them into individual labels, and wrap them around the sides of the container C.

The stroke of the applicator plate yokes 184, 186 is such that the applicator plates 182 stop short of transverse diametrical plane of the respective container so that the applicator bands applying two labels to opposite sides of the same container C will not interfere with one another. Thus, it can be seen in FIG. 15, for example, that the leading edge 216 of applicator plate 182c is spaced from the trailing edge 218 of the opening 202 in applicator plate 182d even though such applicator plates 182c, 182d are in their most advanced position.

After the applicator plates 182 have advanced to apply the labels to the containers C, they are withdrawn and the resilient bands 158 to 164 return to their position in the grooves of the respective vertical transfer plates 54, 56, 58. The vertical transfer plates 54, 56, 58 are then elevated to their raised position (FIG. 8) and the container conveyor 181 is indexed to advance labeled containers C and bring into position a new set of six containers ready to have labels applied in the next cycle of operation.

After the vertical transfer plates 54, 56, 58 return to their raised position, the horizontal transfer plates 32 to 38 are moved to the right to again advance three groups of connected labels into position for transfer to the vertical transfer plates 54, 56, 58 as previously described. In this regard it is noted that the openings 202 in the applicator plates 182 received the horizontal transfer plates 32 to 38 as the latter are advanced into label transfer position.

The indexing device 10 and feed device 12 operate in synchronism with the label application device 14 so that each time the vertical transfer plates 54, 56, 58 are returned to their raised position, the horizontal transfer plates 32 to 38 are advanced to supply the necessary labels.

From the above description it will be seen that the webs 24 to 30 from the four rolls of labels 16 to 22 respectively, may be fed and indexed whereby groups of three labels are severed from each web and advanced horizontally to a position where they are transferred to vertical transfer plates which lower the labels to a position where heaters may be applied to heat the adhesive on the labels and thence to yet a lower position when the groups of three labels are severed into individual labels and substantially simultaneously applied to six containers.

Although in the illustrated embodiment, four parallel webs are fed and indexed, any number of webs may be arranged in parallel thereto by subtracting or adding indexing arms and appropriate horizontal transfer plates, holding plates, vertical transfer plates, applicator plates, and associated apparatus.

In the above description every third label is registered, indexed, and severed from each web. It will be understood that any number of labels may be registered, indexed and severed as may be desired. In cases where each label in the web is to be indexed, the bell crank level 68 may be continuously maintained in its indexing position shown in broken lines in FIG. 1 so that each line of weakness of the label will be indexed. In such a case, the actuating finger 98 may be removed or otherwise dispensed with since it would not be necessary to pivot the bell crank lever 68. However, to operate in this mode, two levels of vacuum are required. A high vacuum is applied to pull the label perforation lines 50 past the vertical indexing rod 76. A low value of vacuum is then applied to the transfer plates 32 to 38, as it nears the end of its stroke, allowing the label 52 to bend at the weakness 50, to increase resistance to pulling, causing the label to slip with respect to the plates 32 to 38. Also, as may be desired, additional label breaking devices may be employed on mating horizontal transfer plates and holding plates to separate all the individual labels before the latter are transferred to the vertical transfer plates.

For the purpose of clarity in the above description, it will be noted that in some instances, details of construction and operation of the apparatus for indexing and feeding of only one of the four webs has been set forth. However, it will be readily apparent from the drawings that since four webs are fed in parallel, complete apparatus for handling each of the four webs is provided.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. Label application apparatus for substantially simultaneously applying labels to a plurality of articles, comprising:
   means for intermittently feeding labels from a continuous web wherein individual labels are separated by weakened lines;
   label breaker means operable with said feed means for separating labels from the web along said lines of weakness;
   transfer means receiving said separated labels and transferring the latter in a transverse direction to a position adjacent to a plurality of spaced articles to which the labels are to be applied;
   and said transverse means carrying applicator means operable to carry the labels from the transfer means to the adjacent articles to substantially simultaneously apply said labels to said plurality of articles.

2. Label application apparatus according to claim 1 wherein said label feeding means includes:
   horizontally reciprocal transfer plates each having passages opening up to the surface thereof so that vacuum applied to said passages will hold a web on said transfer plates as the latter are advanced;
   stationary holding plates;
   label breaking means on corresponding pairs of holding and transfer plates comprising a pair of opposed grooves in said holding and transfer plates;
   a resilient diaphragm over one of said grooves;
   and means admitting air under pressure to said one groove to thereby expand the diaphragm into the opposing open groove and in so doing breaking the line of weakness of the web which is disposed between said diaphragm and said opposed open groove.

3. Label application apparatus according to claim 1 wherein said label feeding means includes horizontally reciprocal transfer plates each having passages opening up to the surface thereof so that vacuum applied to said passages will hold a web on said transfer plate;
   and power means for reciprocating said horizontal transfer plate from a retracted position whereby the horizontal transfer plate grips the leading end portion of the web and pulls the continuous web to an advanced position.

4. Label application apparatus according to claim 3 wherein said label feeding means includes holding plates each having passages opening up to the surface thereof so that vacuum applied to said passages will hold the web on said holding plate when said transfer plate is being returned from its advanced to its retracted position.

5. Label application apparatus according to claim 3 wherein said transfer means includes:
   vertically reciprocal transfer plates each having passages opening up to the surface thereof so that vacuum applied to said passages will hold labels on said vertical transfer plates, said vertical transfer plates each receiving severed labels from the horizontal transfer plates when the latter are in said advanced position;
   and power means for reciprocating said vertical transfer means from an elevated position where the labels are received from said horizontal transfer plates to an intermediate position where the labels are heated, and to a lowered position where the labels are applied to said articles.

6. Label application apparatus according to claim 5 further including heating means having heating elements reciprocal from a withdrawn position wherein said heating elements are clear of the reciprocal path of movement of the vertical transfer plates to an inserted position wherein the heating elements are disposed adjacent the labels on the vertical transfer plates in a position to heat an adhesive on said labels.

7. Label application apparatus according to claim 6 wherin said heating elements include:
   a plurality of elongated plates having one end fixed to a support beam;
   and power means having a piston rod connected to said support beam for reciprocating said heating elements between said withdrawn and inserted positions.

8. Label application apparatus according to claim 1 wherein said transfer means includes:
   vertically reciprocal transfer plates having passages opening up to the surface thereof so that vacuum applied to said passages will hold the labels on said vertical transfer plate, said applicator means comprising flexible bands carried in elongated grooves in said vertical transfer plates and said labels being held against said resilient bands by said applied vacuum.

9. Label application apparatus according to claim 8 wherein said flexible bands are flush with the respective surfaces of said transfer plates.

10. Label application apparatus according to claim 8 wherein said applicator means includes:
    a plurality of applicator plates each having one end fixed to a support member;
    and power means operable to reciprocate said support member and applicator plates between a retracted position in which the plates engage said resilient bands while the latter are disposed in the elongated grooves in the transfer plates and an advanced position where the applicator plates advance the resilient bands to a position wherein the latter engage the articles to apply the labels thereto.

11. Label application apparatus according to claim 10 wherein said vertical transfer plates are provided with elongated slots, and said applicator plates are reciprocal in said slots between said retracted and advanced positions.

12. Label application apparatus according to claim 10 wherein said transfer means includes:
    a yoke element to which the ends of each of said vertical transfer plates are connected;
    and said power means for said applicator plates being mounted on said yoke element, whereby said power means for said applicator means is carried with said transfer means.

13. Label application apparatus according to claim 10 wherein each of said applicator plates is provided with an opening, part of which is defined by an edge which engages one resilient band to advance the latter to a position wherein the band engages the article to apply the label thereto, each of said plates having leading edges which engage another resilient band to advance the latter to a position wherein the band engages another article to apply the label thereto, whereby each applicator plate simultaneously advances two different resilient bands to apply labels to two different articles.

14. Label application apparatus according to claim 13 wherein said resilient bands are secured to said leading edges of said applicator plates and to said edges defining part of each of said openings of said applicator plates.

15. Label application apparatus according to claim 10 wherein a plurality of spaced applicator plates are connected to one yoke and another plurality of applicator plates are connected to another yoke and power means are provided for advancing said yokes towards one another whereby one plurality of applicator plates advance a plurality of resilient bands in one direction to apply a plurality of labels to one side of said articles and the other plurality of applicator plates advances another plurality of resilient bands in an opposite direction to apply another plurality of labels to an opposite side of said articles.

16. Label application apparatus according to claim 15 wherein said applicator plates pass between two articles in one row of articles to advance a resilient band to apply a label to article in another row of such articles.

17. A method of simultaneously applying labels to a plurality of articles, comprising the steps of:
    intermittently feeding labels in one direction from a continuous web where individual labels are separated by weakened lines;
    separating labels from the web along said lines of weakness;
    carrying said separated labels in a direction transverse to said first direction to a position adjacent the sides of a plurality of spaced articles to which the labels are to be applied;
    and simultaneously advancing said labels to the adjacent articles to substantially simultaneously apply said labels to said plurality of articles.

18. The method of simultaneously applying labels according to claim 17 wherein carrying said labels in said transverse direction, comprises:
    lowering said labels vertically to a position between two rows of spaced articles;
    and said step of advancing said labels to the adjacent articles involves moving said labels substantially horizontally into contact with said articles.

19. The method of simultaneously applying labels according to claim 17 including the step of heating an adhesive on said labels as the latter are moved in said transverse direction.

20. The method of simultaneously applying labels according to claim 17 including the further step of:
    providing a transfer plate carrying a resilient band;
    locating said severed labels against said resilient band;
    and advancing said resilient band to a position where the latter flexes to conform to the configuration of a portion of the articles to thereby apply said labels to the surface of said articles.

21. The method of simultaneously applying labels according to claim 20 wherein a plurality of said bands are provided and said plurality of bands are substantially simultaneously advanced to apply labels to at least two rows of articles.

22. The method of claim 17 wherein labels are substantially simultaneously applied on either side of each of said articles.

References Cited
UNITED STATES PATENTS

| | | | |
|---|---|---|---|
| 2,516,783 | 7/1950 | Matter | 156—521X |
| 2,543,968 | 3/1951 | Heyward | 156—557X |
| 3,036,941 | 5/1962 | Sigmon | 156—559X |
| 3,306,807 | 2/1967 | Schlotthauer | 156—556X |
| 3,431,702 | 3/1969 | Spaulding | 53—281 |

SAMUEL FEINBERG, Primary Examiner

J. M. HANLEY, Assistant Examiner

U.S. Cl. X.R.

156—557, 561, 475; 53—137